(12) United States Patent
Otanez

(10) Patent No.: US 9,091,329 B2
(45) Date of Patent: Jul. 28, 2015

(54) SYSTEMS AND METHODS FOR CONTROLLING A TRANSMISSION DURING A GARAGE SHIFT

(71) Applicant: GM GLOBAL TECHNOLOGY OPERATIONS LLC, Detroit, MI (US)

(72) Inventor: Paul G. Otanez, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 253 days.

(21) Appl. No.: 13/875,540

(22) Filed: May 2, 2013

(65) Prior Publication Data
US 2014/0329635 A1 Nov. 6, 2014

(51) Int. Cl.
*F16H 3/44* (2006.01)
*F16H 3/66* (2006.01)

(52) U.S. Cl.
CPC .. *F16H 3/44* (2013.01); *F16H 3/66* (2013.01); *F16H 2200/0069* (2013.01); *F16H 2200/2012* (2013.01); *F16H 2200/2046* (2013.01)

(58) Field of Classification Search
CPC ......... F16H 3/44; F16H 3/62; F16H 59/0208; F16H 61/0204; F16H 61/0265; F16H 2061/0455; F16H 2061/0485; F16H 2061/0488; F16H 61/06; F16H 2306/22
USPC ........................................................ 701/51, 67
See application file for complete search history.

(56) References Cited

U.S. PATENT DOCUMENTS

| | | | |
|---|---|---|---|
| 2007/0149356 A1* | 6/2007 | Sato et al. ...................... | 477/156 |
| 2008/0047794 A1* | 2/2008 | Ogata et al. ..................... | 192/3.3 |
| 2010/0063698 A1* | 3/2010 | Lee et al. ......................... | 701/67 |
| 2011/0034288 A1* | 2/2011 | Phillips et al. ................ | 475/275 |

* cited by examiner

*Primary Examiner* — Edwin A Young
(74) *Attorney, Agent, or Firm* — Quinn Law Group, PLLC

(57) ABSTRACT

A method for controlling a transmission includes the following steps: applying a first assist clutch to interconnect a first stationary member to a first planetary gear set of the transmission; applying a second assist clutch to interconnect a second stationary member to a second planetary gear set of the transmission, wherein the second planetary gear set is coupled to the output member of the transmission; applying a primary clutch to interconnect the first planetary gear set to a third stationary member; reducing a first pressure applied to the first assist clutch of the transmission by a first pressure calibration value; determining whether a gear lash has occurred; and reducing a second pressure applied to the second assist clutch of the transmission.

20 Claims, 14 Drawing Sheets

| GEAR STATE | GEAR RATIO | RATIO STEP | TORQUE TRANSMITTING ELEMENTS ||||||
|---|---|---|---|---|---|---|---|---|
| | | | 32 | 30 | 34 | 36 | 28 | 26 |
| REV | -2.870 | | X | | | | | X |
| N | | -0.64 | | | | | | |
| 1ST | 4.455 | | X | | X | | | |
| 2ND | 2.912 | 1.53 | | X | X | | | |
| 3RD | 1.894 | 1.54 | | | X | | | X |
| 4TH | 1.446 | 1.31 | | | X | | X | |
| 5TH | 1.000 | 1.45 | | | | | X | X |
| 6TH | 0.851 | 1.18 | X | | | X | | |
| 7TH | 0.742 | 1.15 | | X | | | X | |
| 8TH | 0.609 | 1.22 | | | | X | X | |
| 9TH | 0.556 | 1.09 | | X | | X | | |
| 10TH | 0.505 | 1.10 | | | | X | | X |

X = ON - ENGAGED CARRYING TORQUE
O = ON - ENGAGED NOT CARRYING TORQUE

FIG. 1C

| Shift (or) Gear State | Active Clutches | Steady State Applied Clutches |
|---|---|---|
| N | – | 32 |
| N – D | 34, 36 | 32 |
| R – D | 26, 34, 36 | 32 |
| R-D Rolling Garage Shift | 26, 34, 36, 30 | 32 |
| D – 1st Gear – Launch | – | 32, 34 |
| D – 1st Gear Steady State | – | 32, 34 |

FIG. 3

| Shift (or) Gear State | Active Clutches | Steady State Applied Clutches |
|---|---|---|
| N | 32 | – |
| N – D | 34, 32 | – |
| R – D | 26, 34, 36, 32 | – |
| R-D Rolling Garage Shift | 26, 34, 36, 30, 32 | – |
| D – 1st Gear – Launch | 32 | 34 |
| D – 1st Gear Steady State | – | 32, 34 |

FIG. 6

SYSTEMS AND METHODS FOR CONTROLLING A TRANSMISSION DURING A GARAGE SHIFT

TECHNICAL FIELD

The present disclosure relates to systems and methods of controlling a transmission to minimize a garage shift time and minimize driveline torque disturbances during a garage shift.

BACKGROUND

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

A dog clutch, band clutch, or other high gain clutch may be used in a transmission when it is desired to limit or eliminate slippage. When disengaged, the spin loss contribution from the dog clutch or band clutch is minimal compared to a multi-plate friction clutch. In addition, some high gain clutches may be desirable because they may occupy less space than a friction clutch.

SUMMARY

The present disclosure relates to systems and methods of controlling a transmission to minimize a garage shift time and minimize driveline torque disturbances during a garage shift. In an embodiment, the method includes one or more of the following steps: detecting an initiation of a garage shift of the transmission; in response to such detection, applying a first assist clutch to interconnect a first stationary member to a first planetary gear set of the transmission; applying a second assist clutch to interconnect a second stationary member to a second planetary gear set of the transmission, wherein the second planetary gear set is coupled to the output member of the transmission; applying a primary clutch to interconnect the first planetary gear set to a third stationary member; reducing a first pressure applied to the first assist clutch of the transmission by a first pressure calibration value; determining whether a gear lash has occurred; and after determining whether the gear lash has occurred, reducing a second pressure applied to the second assist clutch of the transmission to minimize driveline torque disturbances during the garage shift.

In an embodiment, the step of determining whether the garage lash has occurred further includes the following steps: monitoring a turbine speed of a torque converter coupled to the transmission when the primary clutch is applied or when the garage shift is initiated to determine a maximum turbine speed; and monitoring the turbine speed after the garage shift has been initiated to determine an actual turbine speed. The step of determining whether the garage lash has occurred further includes determining if the actual turbine speed is less than a difference between the maximum turbine speed and a turbine speed calibration value. The step of reducing the second pressure includes reducing the second pressure applied to the second assist clutch by a second pressure calibration value if the actual turbine speed is not less than the difference between the maximum turbine speed and the turbine speed calibration value.

In an embodiment, the step of reducing the second pressure includes reducing the second pressure applied to the second assist clutch by a third pressure calibration value if the actual turbine speed is less than the difference between the maximum turbine speed and the turbine speed calibration value, the third pressure calibration value being greater than the second pressure calibration value. The step of reducing the second pressure applied to the second assist clutch by the third pressure calibration value is performed if a predetermined amount of time has passed since applying the primary clutch even if the actual turbine speed is not less than the difference between the maximum turbine speed and the turbine speed calibration value. The predetermined amount of time may be a function of the transmission output speed when the garage shift is initiated and may be about one second. The step of reducing the second pressure of the second assist clutch of the transmission is performed when a predetermined amount of time has passed since the initiation of the garage shift even if the gear lash has not occurred.

The step of reducing the first pressure applied to the first assist clutch of the transmission by the first pressure calibration value is repeated if the first pressure is less than or equal to a first predetermined pressure threshold and the second pressure is less than or equal to a second predetermined pressure threshold. The first predetermined pressure threshold may be about zero. The second predetermined pressure threshold may be about zero.

In an embodiment, the step of reducing the second pressure applied to the second assist clutch of the transmission is repeated if the first pressure is less than or equal to a first predetermined pressure threshold and the second pressure is less than or equal to a second predetermined pressure threshold. The primary clutch may be a dog clutch.

In an embodiment, the method of controlling a transmission includes one or more of the following steps: applying a first assist clutch to interconnect a first stationary member to a first member of a first planetary gear set of the transmission, the first planetary gear set including the first member, a second member, and a third member; applying a second assist clutch to interconnect a second stationary member to a first member of a second planetary gear set of the transmission; applying a primary clutch to interconnect the second member of the first planetary gear set to a third stationary member; measuring a turbine speed of a turbine of a torque converter coupled to an input member of the transmission when the primary clutch is applied to determine a maximum turbine speed; reducing a first pressure applied to the first assist clutch of the transmission by a first pressure calibration value after applying the primary clutch; measuring the turbine speed after reducing the first pressure to determine an actual turbine speed; determining whether the actual turbine speed is less than a difference between the maximum turbine speed and a turbine speed calibration value in order to determine whether a gear lash has occurred; and reducing a second pressure of a second assist clutch by a second pressure calibration value if the actual turbine speed is not less than the difference between the maximum turbine speed and the turbine speed calibration value; and reducing the second pressure of the second assist clutch by a third pressure calibration value if the actual turbine speed is less than the difference between the maximum turbine speed and the turbine speed calibration value to minimize driveline torque disturbances during a garage shift.

In an embodiment, the method may further include repeating the step of reducing a first pressure applied to the first assist clutch of the transmission by a first pressure calibration value if the first pressure is not zero. The step of reducing the second pressure of the second assist clutch by the third pressure calibration value is performed after a predetermined amount of time has passed since applying the primary clutch even if the actual turbine speed is not less than the difference between the maximum turbine speed and the turbine speed calibration value. The predetermined amount of time may be one second. The second pressure calibration value is greater than the first pressure calibration value. The third pressure calibration value is greater than the second pressure calibration value. The method may further include detecting the garage shift before applying a first assist clutch.

In an embodiment, the method of controlling the transmission includes the following steps: applying assist clutches to interconnect stationary members to planetary gear sets of the transmission; applying a dog clutch to interconnect a member of one of the planetary gear sets to one of the stationary members; measuring a rotational speed of a rotational member of the transmission when the primary clutch is applied to determine a maximum turbine speed; reducing pressures applied to the assist clutches of the transmission by a first pressure calibration value after applying the primary clutch; measuring the rotational speed of the rotational member after reducing the pressures of the assist clutches by the first pressure calibration value to determine an actual turbine speed; determining whether the actual turbine speed is less than a difference between the maximum turbine speed and a turbine speed calibration value in order to determine whether a gear lash has occurred; reducing the pressures applied to the assist clutches by a second pressure calibration value if the actual turbine speed is not less than the difference between the maximum turbine speed and the turbine speed calibration value; and reducing the pressures applied to the assist clutches by a third pressure calibration value if the actual turbine speed is less than the difference between the maximum turbine speed and the turbine speed calibration value to minimize driveline torque disturbances during a garage shift. The third pressure calibration value is greater than the second pressure calibration value.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 1C is a truth table presenting the state of engagement of the various torque transmitting elements in each of the available forward and reverse speeds or gear ratios of the transmissions illustrated in FIGS. 1-2;

FIG. 3 a shift diagram illustrating an embodiment of a method of shifting the transmission of FIGS. 1A-1B when the input is connected to a torque converter;

FIG. 6 is a shift diagram illustrating a method of shifting the transmission of FIGS. 1A-1B when the input is connected directly to an engine or motor without a torque converter;

DETAILED DESCRIPTION

Figure 1A:
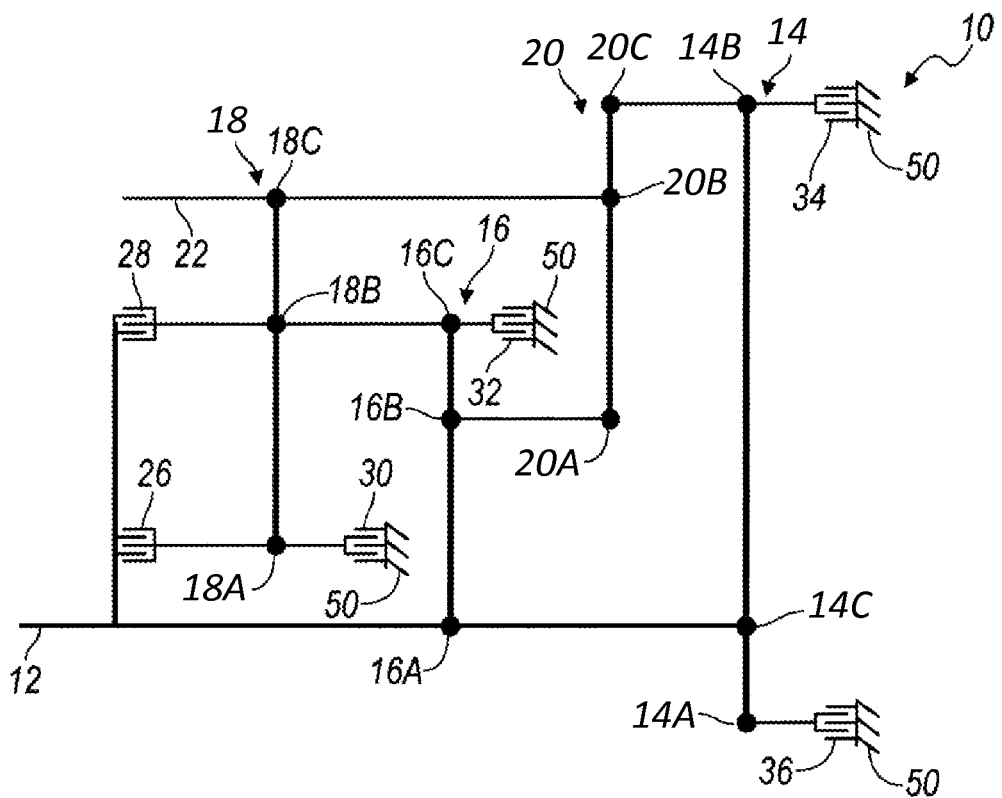
FIG. 1A is a lever diagram of a ten speed transmission.

In some forms of the present disclosure, a nine or ten speed transmission is provided in a relatively small package by achieving nine or ten forward speeds with four planetary gear sets, four brakes, and three clutches. In other variations, however, additional brakes, clutches, planetary gear sets, or other components may be added or omitted and, the methods described herein may be used in transmissions with a lower or higher number of gear states as garage shifts could be independent of the number of gear states present in the transmission.

The nine or ten speed automatic transmissions illustrated herein have an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

Referring to the drawings, wherein like reference numbers refer to like components, FIG. 1 illustrates a ten speed transmission 10 in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratio and ratio progression. Mechanical couplings or interconnections between the nodes of the various planetary gear sets are illustrated by thin, horizontal lines and torque transmitting devices such as clutches and brakes are presented as interleaved fingers.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1A, the first planetary gear set 14 has three nodes: a first node 14A, a second node 14B, and a third node 14C. The second planetary gear set 16 has three nodes: a first node 16A, a second node 16B, and a third node 16C. The third planetary gear set 18 has three nodes: a first node 18A, a second node 18B, and a third node 18C. The fourth planetary gear set 20 has three nodes: a first node 20A, a second node 20B, and a third node 20C.

The input member 12 may be a rotational member and is continuously coupled to the first node 16A of the second planetary gear set 16 and the third node 14C of the first planetary gear set 14. The output member 22 may be a rotational member and is continuously coupled to the third node 18C of the third planetary gear set 18 and the second node 20B of the fourth planetary gear set 14. The first node 20A of the fourth planetary gear set 20 is coupled to the second node 16B of the second planetary gear set 16. The second node 20B of the fourth planetary gear set 20 is coupled to the third node 18C of the third planetary gear set 18. The third node 20C of the fourth planetary gear set 20 is coupled to the second node 14B of the first planetary gear set 14. The third node 16C of the second planetary gear set 16 is coupled to second node 18B of the third planetary gear set 18.

A first torque transmitting device, such as first brake 36, selectively connects the first node 14A of the first planetary gear set 14 with the stationary member or transmission housing 50. A second brake 34 selectively connects the third node 20C of the fourth planetary gear set 20 and the second node 14B of the first planetary gear set 14 with the stationary member or transmission housing 50. The first brake 36 may be referred to as the first assist clutch.

The second brake 34 is a high gain clutch, such as a dog clutch, or a band clutch. Alternatively, the second brake 34 may be a primary clutch, which in turn may be a dog clutch. For example, the second brake 34 may exhibit a high torque even with a low pressure applied to it. The high gain clutch 34 may be capable of carrying high levels of torque after full engagement. An example of a high gain clutch 34 includes a dog clutch having near, or negligible, zero spin losses. The dog clutch may have teeth with grooves formed therein that are selectively engageable with a second set of grooves formed in another set of teeth on the surface of the stationary member 50; however, the dog clutch may have any other suitable shape. Thus, the dog clutch may have two halves having opposed teeth and grooves, one half which is connected to the stationary member 50 or another member, and the other half which is connected to a shaft 42. The dog clutch engages, not by friction, but by interference and meshing of the teeth and grooves of the halves of the dog clutch. In another variation, the high gain clutch 34 may be a band clutch having a friction band or non-friction band that tightens around a shaft or drum, by way of example. The second brake 34 may be any kind of friction primary clutch. Thus, the second brake 34 may be generally referred to as the primary clutch.

A first clutch 26 selectively connects the input member or shaft 12, the first node 16A of the second planetary gear set 16, and the third node 14C of the first planetary gear set 14 with the first node 18A of the third planetary gear set 18. A second clutch 28 selectively connects the input member or shaft 12, the first node 16A of the second planetary gear set 16, and the third node 14C of the first planetary gear set 14 with the second node 18B of the third planetary gear set 18 and the third node 16C of the second planetary gear set 16.

A third brake 30 selectively connects the first node 18A of the third planetary gear set 18 with a stationary member or transmission housing 50. A fourth brake 32 selectively connects the third node 16C of the second planetary gear set 16 and the second node 18B of the third planetary gear set 18 with the stationary member or transmission housing 50. The third brake 30 may also be referred to as the holding clutch. The fourth brake 32 may also be referred to as the second assist clutch.

The first and second clutches 26, 28, and the first, third, and fourth brakes 36, 30, 32, may be friction disc clutches, for example, a plurality of interleaved friction and/or non-friction discs in a clutch pack. The friction clutches may have slippage when applied, providing for a smooth shifting transition.

Figure 1B:
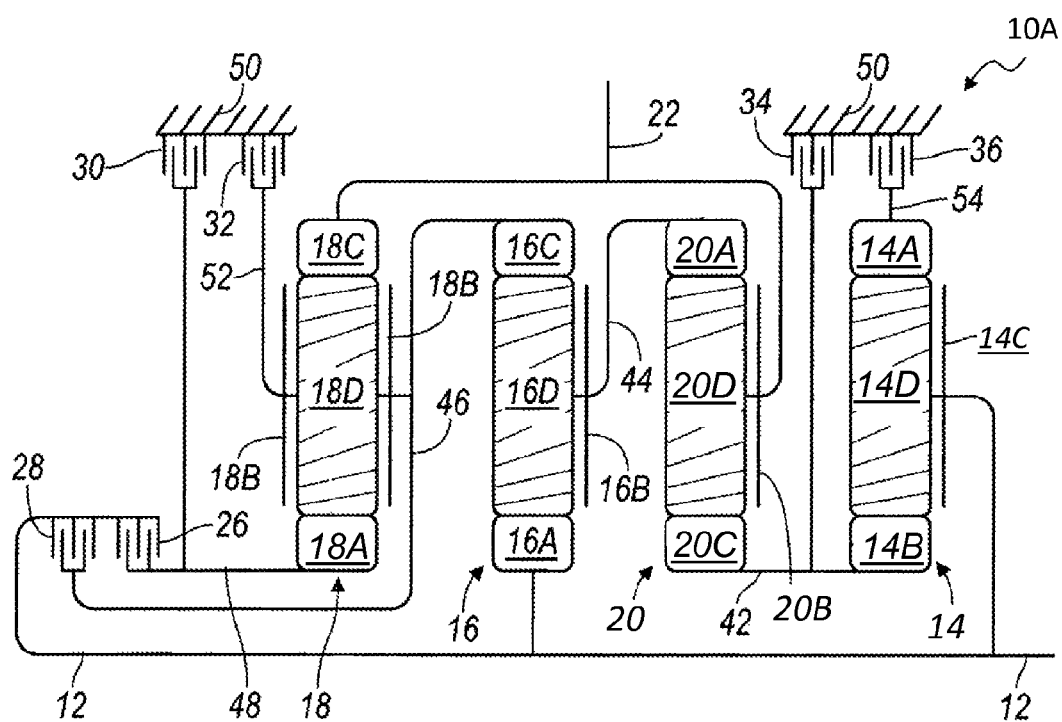
FIG. 1B is a diagrammatic illustration of another ten speed transmission.

Referring now to FIG. 1B, a stick diagram presents a schematic layout of an embodiment of the ten speed transmission 10A. In FIG. 1B, the numbering from the lever diagram of FIG. 1A is carried over. The clutches and couplings are correspondingly presented whereas the nodes of the planetary gear sets now appear as components of planetary gear sets such as sun gears, ring gears, planet gears and planet gear carriers. FIG. 1B is one possible embodiment of transmission illustrated in the lever diagram of FIG. 1A.

For example, the planetary gear set 20 includes a sun gear member 20C, a ring gear member 20A, and a planet gear carrier member 20B that rotatably supports a set of planet gears 20D (only one of which is shown). The fourth planetary gear set 20 is a simple planetary gear set in this variation. However, the fourth planetary gear set 20 may alternatively be a compound planetary gear set. The sun gear member 20C is connected for common rotation with a first shaft or interconnecting member 42. The ring gear member 20A is connected for common rotation with a second shaft or interconnecting member 44. The planet carrier member 20B is connected for common rotation with the output shaft or member 22. The planet gears 20D are each configured to intermesh with both the sun gear member 20C and the ring gear member 20A, in this embodiment.

The planetary gear set 16 includes a sun gear member 16A, a ring gear member 16C, and a planet gear carrier member 16B that rotatably supports a set of planet gears 16D (only one of which is shown). The second planetary gear set 16 is a simple planetary gear set in this variation, but in other variations of the present invention, the second planetary gear set 16 could be a compound planetary gear set. The sun gear member 16A is connected for common rotation with the input shaft or member 12. The ring gear member 16C is connected for common rotation with a third shaft or interconnecting member 46. The planet carrier member 16B is connected for common rotation with the second shaft or interconnecting member 44. The planet gears 16D are each configured to intermesh with both the sun gear member 16A and the ring gear member 16C, in this embodiment.

The planetary gear set 18 includes a sun gear member 18A, a ring gear member 18C, and a planet gear carrier member 18B that rotatably supports a set of planet gears 18D (only one of which is shown). The third planetary gear set 18 is a simple planetary gear set in this variation, but in other variations of the present invention, the third planetary gear set 18 could be a compound planetary gear set. The sun gear member 18A is connected for common rotation with a fourth shaft or interconnecting member 48. The ring gear member 18C is connected for common rotation with the output shaft or member 22. The planet carrier member 18B is connected for common rotation with the third shaft or interconnecting member 46 and a fifth shaft or interconnecting member 52. The planet gears 18D are each configured to intermesh with both the sun gear member 18A and the ring gear member 18C, in this variation.

The planetary gear set 14 includes a sun gear member 14B, a ring gear member 14A and a planet gear carrier member 14C that rotatably supports a set of planet gears 14D (only one of which is shown). The first planetary gear set 14 is a simple planetary gear set in this variation, but in other variations of the present invention, the first planetary gear set 14 could be a compound planetary gear set. The sun gear member 14B is connected for common rotation with the first shaft or interconnecting member 42. The ring gear member 14A is connected for common rotation with a sixth shaft or interconnecting member 54. The planet carrier member 14C is connected for common rotation with the input shaft or member 12. The planet gears 14D are each configured to intermesh with both the sun gear member 14B and the ring gear member 14A, in this embodiment.

The input shaft or member 12 is continuously connected to an engine (not shown), to a turbine of a torque converter (not shown), or to an electric motor (not shown). The output shaft or member 22 is continuously connected with the final drive unit or transfer case (not shown).

The torque-transmitting mechanisms or clutches 26, 28 and brakes 30, 32, 34 and 36 allow for selective interconnection of the shafts or interconnecting members, members of the planetary gear sets, and the transmission housing. For example, the first clutch 26 is selectively engageable to connect the input shaft or member 12 with the fourth shaft or interconnecting member 48. The second clutch 28 is selectively engageable to connect the input shaft or member 12 with the third shaft or interconnecting member 46.

The third brake 30 is selectively engageable to connect the fourth shaft or interconnecting member 48 with the stationary element or the transmission housing 50 in order to restrict the member 48 from rotating relative to the transmission housing 50. The fourth brake 32 is selectively engageable to connect the fifth shaft or interconnecting member 52 with the stationary element or the transmission housing 50 in order to restrict the member 52 from rotating relative to the transmission housing 50. The second brake 34, which is a high gain clutch such as a dog clutch or band clutch, is selectively engageable to connect the first shaft or interconnecting member 42 with the stationary element or the transmission housing 50 in order to restrict the member 42 from rotating relative to the transmission housing 50. The first brake 36 is selectively engageable to connect the sixth shaft or interconnecting member 54 with the stationary element or the transmission housing 50 in order to restrict the member 54 from rotating relative to the transmission housing 50.

Referring now to FIGS. 1B and 1C, the operation of the ten speed transmission 10A will be described. It will be appreciated that transmission 10A is capable of transmitting torque from the input shaft or member 12 to the output shaft or member 22 in at least ten forward speed torque ratios and at least one reverse speed or torque ratio. Each forward and reverse speed or torque ratio is attained by engagement of one or more of the torque-transmitting mechanisms (i.e. first clutch 26, second clutch 28, first brake 36, second brake 34, third brake 30, and fourth brake 32), as will be explained below.

FIG. 1C is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. No "O"'s are used in FIG. 1C. Actual numerical gear ratios of the various gear states are also presented, although it should be appreciated that these numerical values are exemplary only and that they may be adjusted over significant ranges to accommodate various applications and operational criteria of the transmission 10A. Of course, other gear ratios are achievable depending on the gear diameter, gear teeth count and gear configuration selected.

For example, to establish a reverse gear, first clutch 26 and fourth brake 32 are engaged or activated. The first clutch 26 connects the input shaft or member 12 with the fourth shaft or interconnecting member 48. The fourth brake 32 connects the fifth shaft or interconnecting member 52 with the stationary element or the transmission housing 50 in order to restrict the interconnecting member 52 from rotating relative to the transmission housing 50. Likewise, the ten forward ratios are achieved through different combinations of clutch and brake engagement, as shown in FIG. 1C.

It will be appreciated that the foregoing explanation of operation and gear states of the ten speed transmission 10A assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 2A:
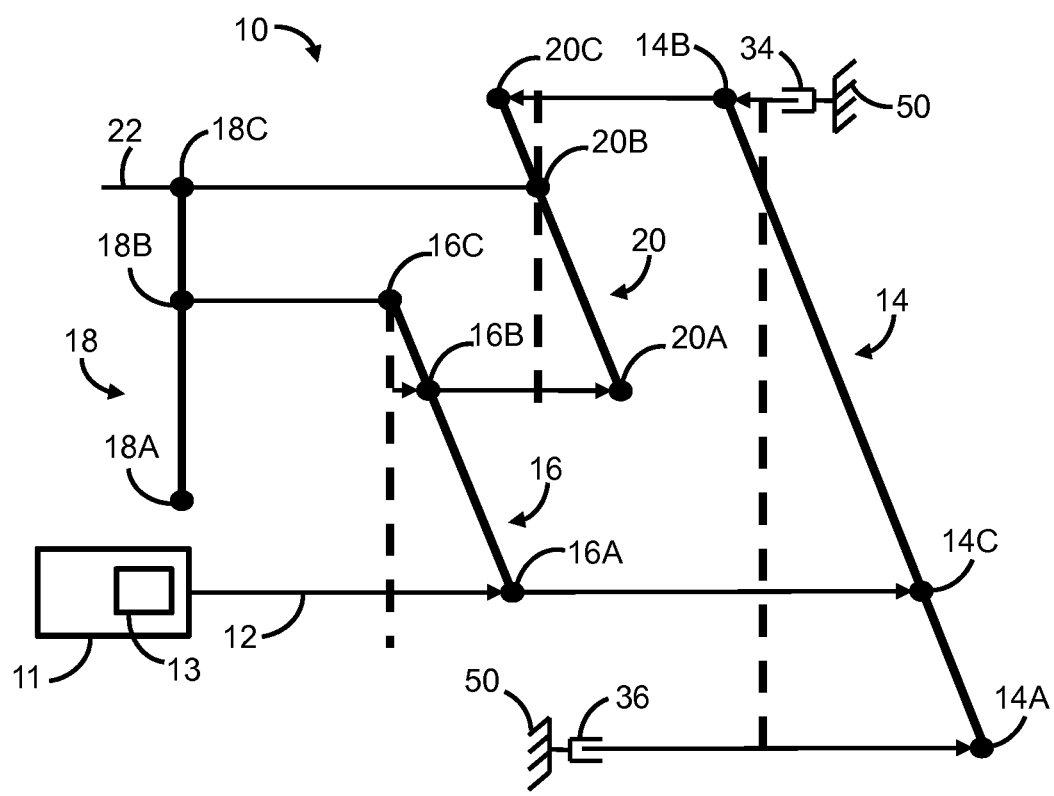
FIG. 2A is a lever diagram of the transmission of FIG. 1A, showing the transmission of FIG. 1A operating in neutral.

Referring now to FIGS. 2A, 2B, 3, and 4, a method of operating the transmission 10A will be described. FIG. 2A illustrates the lever diagram of the transmission 10 or 10A when the vehicle engine or electric motor is on. In this embodiment, FIG. 2A illustrates a transmission for a powertrain having a torque converter 11. The torque converter 11 may include a turbine 13 and operatively couples an engine or a motor to the input member 12. As such, the input member 12 receives torque from the engine or motor through the torque converter 11, and translates torque throughout the gear sets 14, 16, 18, 20 of the transmission 10, 10A. The angular displacement of the levers from their vertical positions indicates motion of the nodes that are displaced from the vertical lines associated with each lever. Nodes to the left of the vertical line associated with their levers are spinning in a negative direction, and nodes to the right of the vertical line associated with their levers are spinning in a positive direction.

In FIG. 2A, the vehicle is in neutral. As shown in FIG. 2A, the following nodes experience motion when the vehicle is turned on and in neutral: 14A, 14B, 14C, 20A, 20C, 16A, and 16B, as each of these nodes is displaced from the vertical line associated with its lever. More specifically, nodes 14A, 14C, 20A, 16A, and 16B are spinning in a positive direction; and nodes 14B and 20C are spinning in a negative direction. As the vehicle is in neutral, the output shaft 22 is not spinning, and likewise, nodes 18A, 18B, 18C, 16C, and 20B are not spinning in neutral. The fourth brake 32 (FIGS. 1A and 1B) may be applied in a steady state manner throughout reverse, drive, and neutral, to brake nodes 18B and 16C, in some embodiments.

As explained above with respect to the high gain clutch 34, it may be desirable to engage the high gain clutch 34 at a zero or low spin speed, in order to engage the opposed surfaces (if a dog clutch) of the high gain clutch 34, and/or to engage the high gain clutch 34 without an abrupt feeling of heavy shifting that would be apparent to vehicle occupants. This abrupt feeling of heavy shifting can be caused by but is not limited to gear lash, rapid acceleration/deceleration of transmission components, etc. Accordingly, it may be desirable to slow down or stop the node 14B on which the high gain clutch 34 acts before applying the high gain clutch 34.

Figure 4:
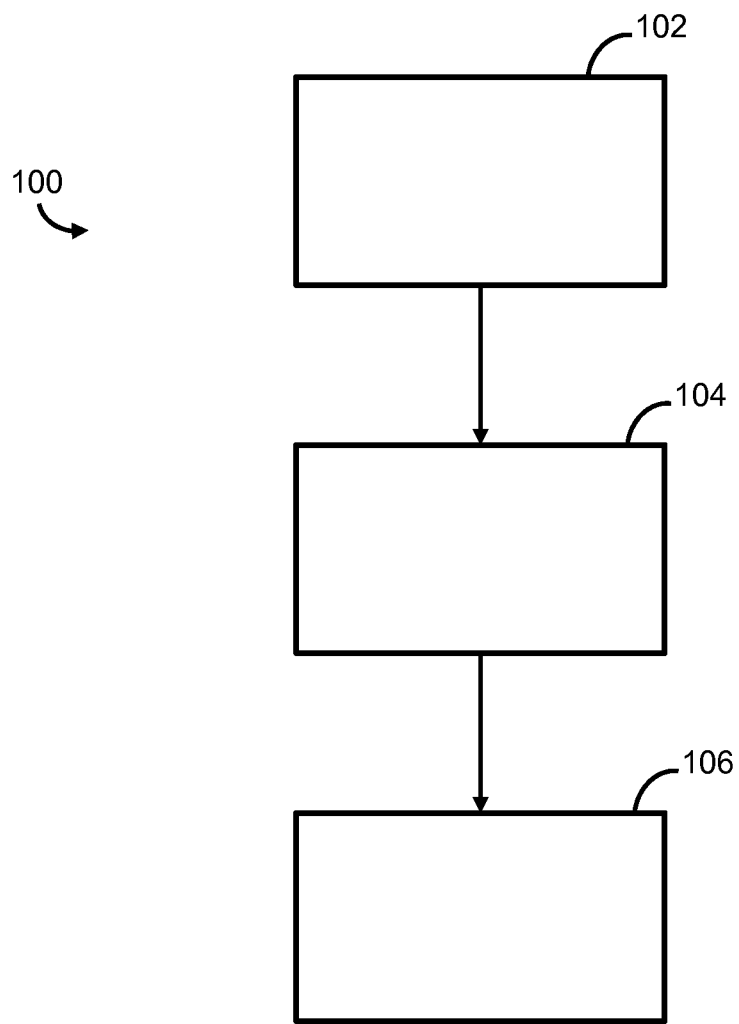
FIG. 4 is a block diagram illustrating a method for shifting a transmission.

Therefore, a method 100 for shifting a transmission, for example, transmission 10, of a motor vehicle is shown in FIG. 4. The method 100 may be used with the transmissions 10, 10A described above or with another transmission. For ease of reference, the method 100 will first be described for use with the transmission 10. However, the method 100 can also be used with the transmission 10A or any other suitable transmission. The method 100 includes a step 102 of applying a torque transmitting device, such as a first brake 36, to interconnect a first member with another member of the plurality of planetary gear sets. Therefore, in the transmission 10, the method 100 can be implemented by applying the first brake 36 to the first node 14A of the first planetary gear set 14.

Figure 2B:
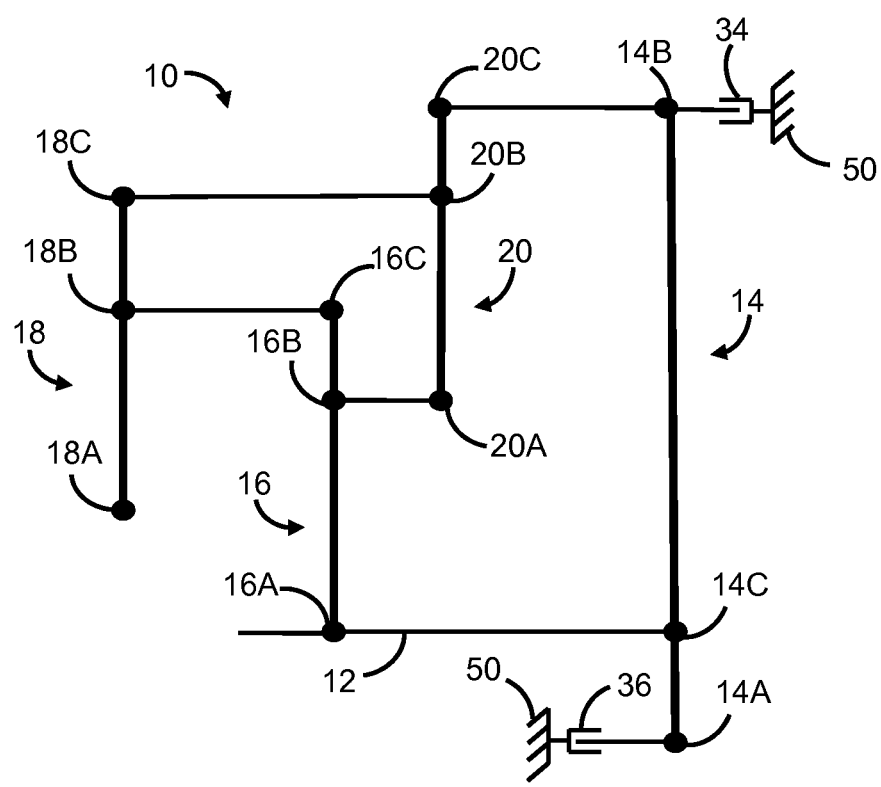
FIG. 2B is a lever diagram of the transmission of FIGS. 1A and 2A.

As shown in FIG. 2B, when the first brake 36 is applied, the first node 14A stops spinning, and the other nodes 14C, 14B of the first lever also stop spinning. Therefore, the second node 14B is stopped; in other words, the slip speed across the oncoming high gain clutch 34 is zero or negligible, and the high gain clutch 34 (which may be a dog clutch or a band clutch) can be easily and smoothly applied to the zero speed or very low speed node 14B. Thus, the method 100 includes a step 104 of applying the high gain clutch 34 to interconnect the second member 14B of the first planetary gear set 14 with the stationary member 50 while the first brake 36 is applied. The input member 12 is also stopped by applying the first brake 36 in neutral, as the third node 14C is connected thereto.

In this embodiment, and in other embodiments described herein, the torque transmitting devices may have pressure applied to them without fully engaging them, to implement the method 100 of the present disclosure. For example, in some variations, the first brake 36 may have pressure applied to it to partially, but not fully, engage the first brake 36, thereby slowing down the node 14A, but allowing some slippage. In such case, the second node 14B will be slowed down, but not necessarily stopped completely. In other embodiments, the first brake 36 can be fully engaged and locked before the second brake 34 is applied.

In the embodiment of FIG. 1B, the first node 14A is the ring gear member 14A, the second node 14B is the sun gear member 14B, and the third node 14C is the planetary gear carrier member 14C. As such, the first brake 36 is applied to the ring gear member 14A to stop the nodes 14A, 14B, 14C of the first planetary gear set 14, and then the second brake 34 (which is a high gain clutch, such as a dog clutch or a band clutch) can be smoothly applied to the sun gear member 14B.

Referring to FIG. 1C, the first brake 36 is not typically applied in the neutral, first gear, or reverse gear ratios. Accordingly, after the high gain clutch 34 is applied, the method 100 includes a step 106 of releasing the torque transmitting mechanism that was first applied. In this embodiment, the step 106 includes releasing the first brake 36 after the high gain clutch 34, i.e., the second brake 34, is applied.

Referring now to FIG. 3, a shift diagram illustrates applications of the method 100 to shift the transmission 10 connected to a torque converter. To shift from neutral to drive, the first brake 36 may be applied and then the second brake 34 is applied, as explained above. The first brake 36 may be fully engaged, or it may merely have pressure applied to it such that it is partially engaged and slipping. In other words, the first brake 36 may be applied, but not fully engaged or locked; but in other variations, it may be applied fully and locked.

Figure 5A:
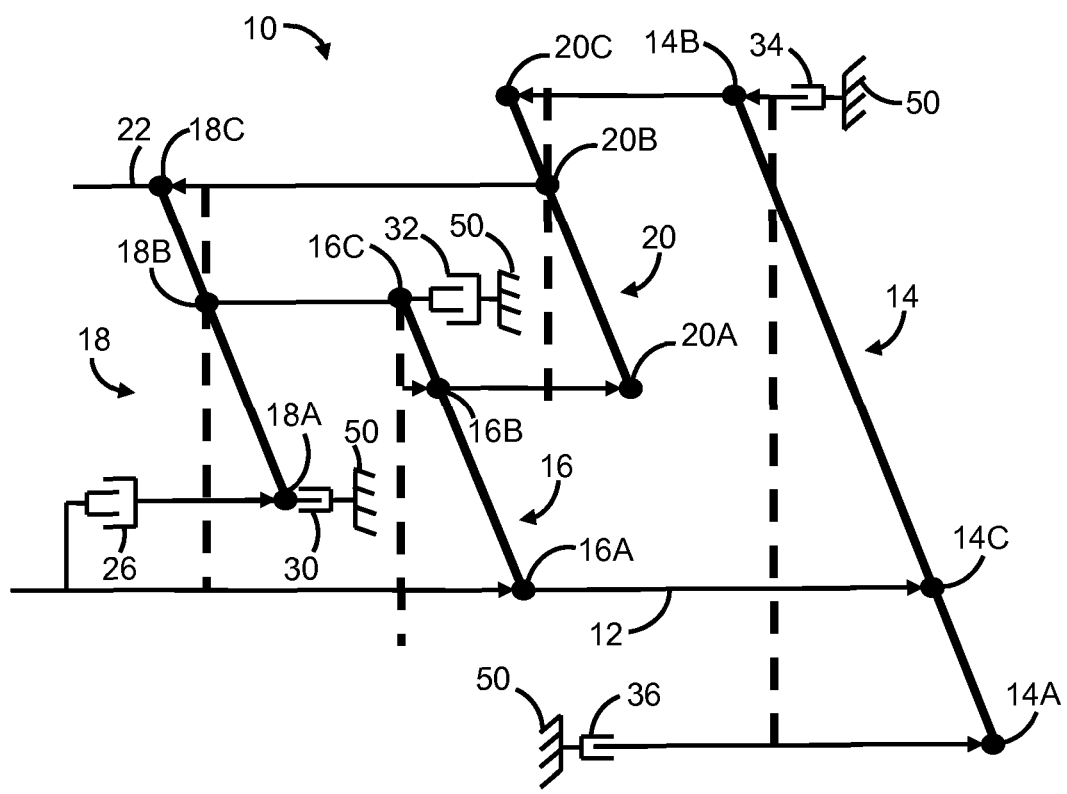
FIG. 5A is a lever diagram of the transmission of FIG. 1A, showing the transmission of FIG. 1A rolling in reverse.
Figure 5B:
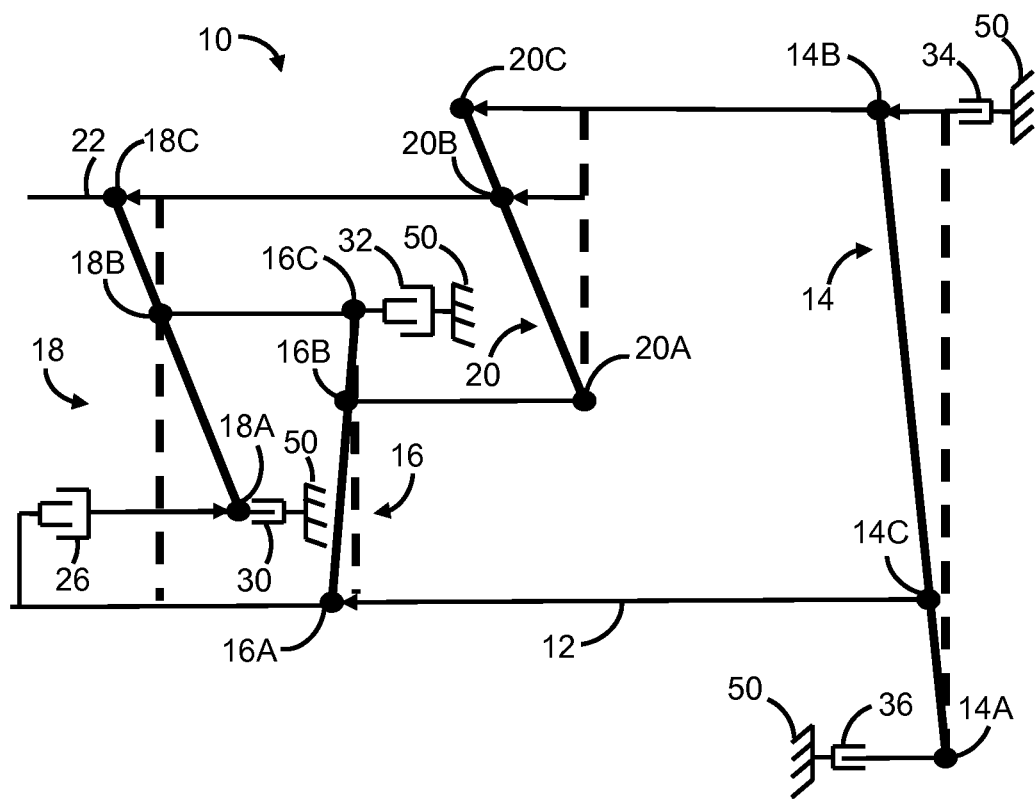
FIG. 5B is a lever diagram of a portion of the transmission of FIGS. 1A and 5A.

Referring now to FIGS. 5A-5B, for a rolling garage shift, when the transmission is rolling in the reverse gear speed ratio, a driver puts the transmission 10 in drive so that the transmission 10 must change to first gear. In this case, the method 100 includes another step of applying the third brake 30 prior to applying the second brake 34 having the high gain clutch. This is because in the reverse gear speed ratio, the output member 22 is spinning and therefore, the nodes 18C and 20B connected to the output member 22 are spinning. Applying a brake to the first member 18A of the third planetary gear set, along with the other brakes applied, aids in reducing the slip speed of the second node 14B of the first planetary gear set 14 to be below a speed threshold, which is desirable before engaging the second brake 34 (which is a dog clutch or band clutch). After the second brake 34 is applied, the method 100 may include a step of releasing the third brake 30.

The fourth brake 32 may be applied in a steady state manner throughout the neutral, reverse, and first gear ratios, in this torque converter application, for example. In other words, the fourth brake 32 is applied to the second node 18B of the third planetary gear set 18 and the third node 16C of the second planetary gear set 16. Accordingly, the fourth brake 32 remains engaged throughout reverse, neutral, and first gears. In other words, the fourth brake 32 remains applied during the steps of applying the first, second, and third brakes 36, 34, 30 and the steps of releasing the first and third brakes 36, 30. Therefore, when the third brake 30 is applied, the result is that the output member 22 will stop spinning because the third node 18C is connected to the output member 22, and the other two nodes 18A, 18B of the third planetary gear set 18 are stopped by the third and fourth brakes 30, 32.

For example, referring to FIG. 5A, the output member 22 is shown spinning in the reverse direction. Accordingly, FIG. 5A illustrates the motion of the nodes of the levers when moving in a reverse direction, prior to shifting into drive. Both the input member 12 and the output member 22 are spinning, as are the nodes 18A, 18C, 16A, 16B, 20A, 20C, 14A, 14B, and 14C. More specifically, the nodes 18C, 20C, and 14B are spinning in the negative direction and the nodes 18A, 16A, 16B, 20A, 14A, and 14C are spinning in a positive direction.

Referring to FIG. 5B, the step 102 is executed to apply the first brake 36, which stops the first node 14A (or first member) of the first planetary gear set 14 from spinning. The fourth brake 32 is also applied as a steady state brake in FIG. 5B, which stops the nodes 18B and 16C from spinning. This does not, however, result in stopping the second member 14B of the first planetary gear set 14 from spinning. As stated above, the goal for engaging the high gain clutch 34 is to have the second member 14B at zero speed, negligible speed, or a low speed. As shown in FIG. 5B, engaging the first brake 36 had the effect of slowing down the second member 14B (as compared to FIG. 5A, where the arrow from the vertical line to the lever for the first planetary gear set 14 is shorter in FIG. 5B as compared to the same arrow in FIG. 5A, indicating that the second member 14B is spinning at a slower rate after application of the first brake 36). However, the second member 14B still spins at a speed that is higher than desirable for activating the high gain clutch 34, because a "hard shift" (though not as hard) would result if only the first brake 36 is applied before applying the high gain clutch 34. In some variations of the present disclosure, a slightly less hard shift will be acceptable, and this constitutes a variation of the present disclosure.

However, in other variations, it may be desirable to slow the second member 14B down further, to zero or near zero slip speed, before applying the high gain clutch 34. Therefore, in addition to applying the first brake 36, and while the fourth brake 32 is applied in a steady state, the third brake 30 is also applied. The third brake 30 stops the first node 18A of the third planetary gear set 18 from spinning. As such, since the fourth brake 32 is also applied as a steady state clutch as shown in FIG. 5B, two out of the three nodes of the third planetary gear set 18 are braked (18A and 18B). Because the first two nodes 18A, 18B of the third planetary gear set 18 are braked, the third node 18C of the third planetary gear set 18 will also stop spinning. Since the third node 18C is connected for common rotation with the output member 22, the result is that the output member 22 will also stop spinning. Essentially, the vehicle can be stopped by applying the fourth brake 32 to the second node 18B of the third planetary gear set 18 and applying the third brake 30 to the first node 18A of the third planetary gear set. With the output member 22 at zero (or near zero) speed, then the first brake 36 is effective in stopping the second member 14B from spinning, as explained and illustrated above with respect to FIGS. 2A and 2B.

FIG. 3 also shows that the first clutch 26 is applied when shifting from reverse to drive. This is because, in accordance with the truth table in FIG. 1C, the first clutch 26 is engaged while the transmission 10 is in a reverse gear ratio.

In another variation, instead of or in addition to applying the third brake 30 when executing a rolling garage shift from reverse to drive, the vehicle may simply be braked via the vehicle braking system prior to applying the second brake (high gain clutch) 34. For example, a vehicle brake command may be sent to stop the vehicle from rolling in reverse after the reverse-to-drive shift command is received. In such a scenario, the third node 18C of the third planetary gear set 18 is essentially braked from output shaft 22 due to the vehicle brakes being applied. Therefore, in this variation, the first brake 36 is applied and the vehicle is braked via the braking system. The fourth brake 32 may also be constantly applied, as explained above. The result is that the slip speed across the second node 14B of the first planetary gear set 14 is zero or negligible, and the high gain clutch (second brake 34) can then be applied smoothly. In order to accomplish this variation without user intervention, the method 100 could include sending a signal to the vehicle braking system to cause the vehicle to automatically brake the motor vehicle, such as through the vehicle traction control system. Accordingly, a driver can be rolling in reverse, and then put the vehicle in drive, and the high gain clutch 34 will be applied smoothly and with little or no noticeable shifting effect to the driver.

In yet another variation, the torque converter is omitted and one of the torque transmitting mechanisms is used to launch the vehicle. With reference to FIG. 6, a shift diagram illustrates the various torque transmitting mechanisms that are applied in an active or steady state manner in different shift scenarios. In the embodiment of FIG. 6, the fourth brake 32 is used to launch the vehicle using the transmission 10. The fourth brake 32 is applied in neutral and in drive, the high gain clutch 34 is applied.

When executing a garage shift in which the vehicle is either stopped in reverse gear or rolling in reverse, and in which the driver puts the vehicle in drive, a "hard shift" may result from applying the high gain clutch 34, if the high gain clutch 34 is applied with the fourth brake 32 only. Therefore, the method 100 is used, wherein the first brake 36 is applied (step 102) before applying the second brake 34 (step 104), and then the first brake 36 is released after the second brake 34 is applied (step 106). Each torque transmitting device may be partially engaged, by having fluid applied to them without fully engaging and locking them; or in other embodiments, the torque transmitting devices may be fully engaged.

However, additional steps of the method 100 may be used for a transmission 10 that is not coupled to a torque converter and is instead coupled directly to a motor or engine output shaft, when shifting from reverse or rolling reverse to drive. This is because applying the first brake 36 will not have the effect of stopping the third node 14C or the second node 14B of the first planetary gear set 14 from spinning, as the input member 12 cannot be stopped (without stalling the motor/engine). Therefore, with no torque converter, the input member 12 will need to remain in motion along with a motor or engine output.

Figure 7A:
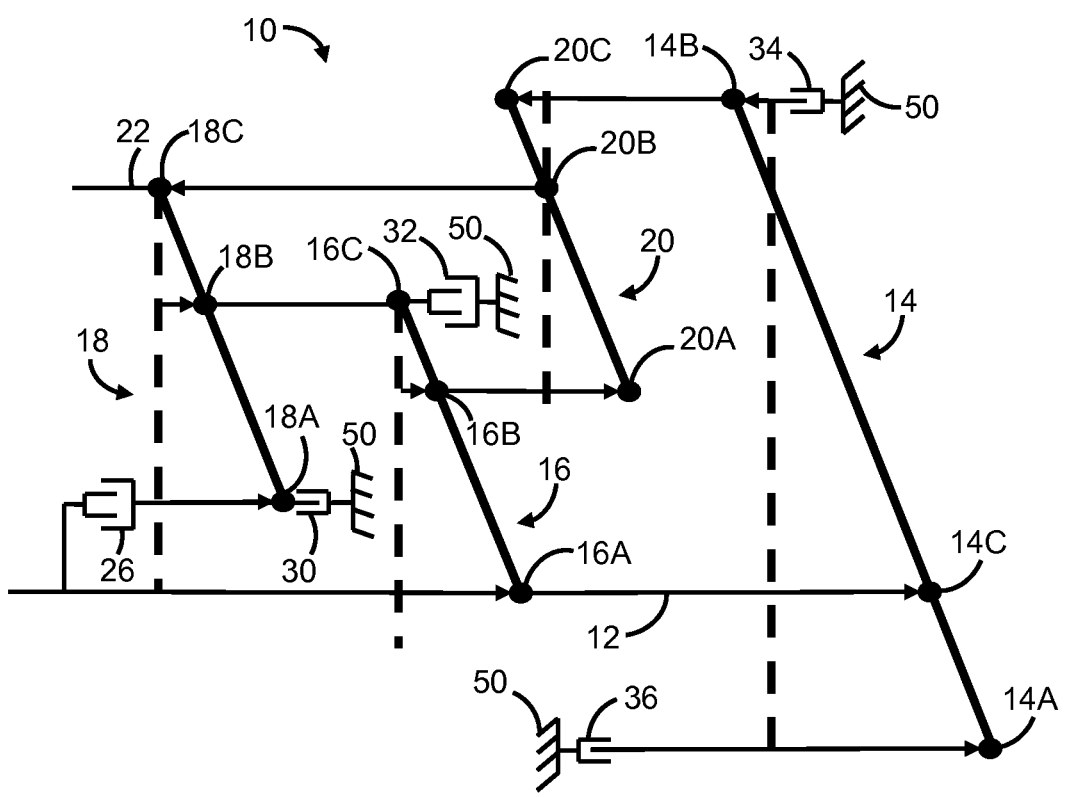
FIG. 7A is a lever diagram of the transmission of FIG. 1A, wherein the transmission of FIG. 1A is operating in neutral and is directly connected to an engine or motor without a torque converter.
Figure 7B:
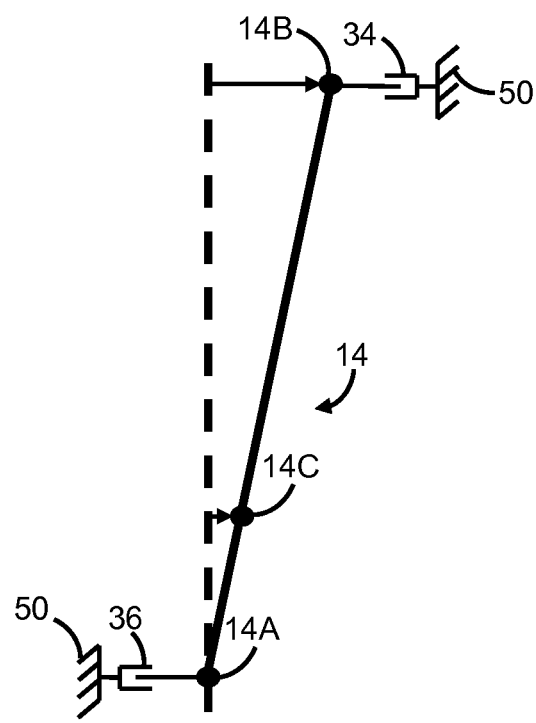
FIG. 7B is a lever diagram of a portion of the transmission of FIGS. 1A and 7A.

For example, referring to FIGS. 7A-7B, the lever diagram is illustrated for the transmission 10, in which the input member 12 is driven directly via a motor or engine, without a torque converter disposed between the engine and the transmission 10. FIG. 7A shows the motion of the transmission nodes, input, and output when the vehicle is in neutral. As such, the output member 22 is motionless, and the input member 12 must continue to rotate to avoid stalling the motor or engine. The nodes 18A, 18B, 16A, 16B, 20A, 14C, and 14A rotate in a positive direction, and the nodes 20C and 14B rotate in a negative direction.

As such, similar to the variations shown and described above, the second member 14B of the first planetary gear set 14 is spinning in the negative direction, which may be undesirable for applying the high gain clutch 34. To smoothly engage the high gain clutch 34 (so that the transmission 10 can proceed into first gear), it may be desirable to stop the second member 14B from spinning. The method 100 may be used to apply the first brake 36 prior to applying the second brake (high gain clutch) 34. However, referring to FIG. 7B, in this embodiment, the input member 12 cannot stop rotating (without stalling), and the third node 14C of the first planetary gear set 14 is continuously connected for common rotation with the input member 12, so the third member 14C will also not stop spinning. Thus, the second member 14B must also continue to spin and cannot be stopped. Accordingly, when the first brake 36 is applied to the first member 14A, both the second and third members 14B, 14C continue spinning, but the second member 14B of the first planetary gear set 14 changes from negative to positive spinning, passing by zero speed.

Figure 7C:
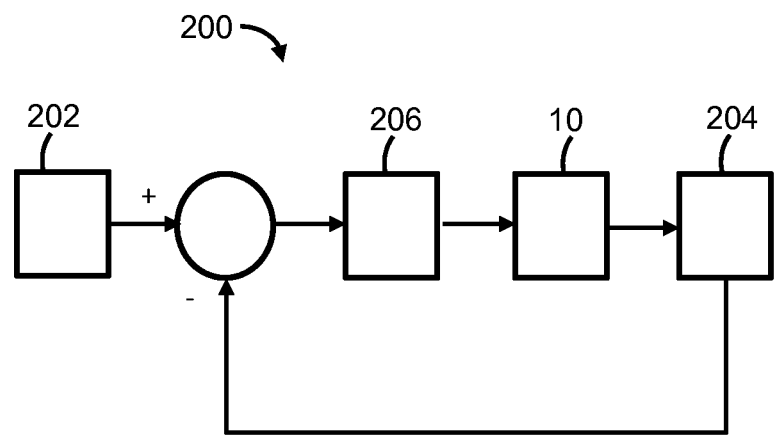
FIG. 7C is a schematic diagram of a control system for use with the method of FIG. 4.

Accordingly, in this embodiment, the method 100 includes applying the second brake (high gain clutch) 34 when the second member 14B reaches zero or near zero speed before it spins in a positive direction as shown in FIG. 7B. Therefore, referring now to FIG. 7C, an algorithm and closed loop control system 200 can be used to determine when the second member 14B is at zero or close to zero speed. A predetermined upper threshold 202 for the desired second node 14B speed is input to the control system 200. In some variations, the predetermined upper threshold speed 202 is near zero.

In order to get the second member 14B to a speed that is at or below the predetermined upper threshold 202, pressure is applied to the first brake 36 without fully engaging the first brake 36. As illustrated in FIGS. 7A-7B, when the first brake 36 is not applied, the second node 14B spins in a negative direction (FIG. 7A), and when the first brake 36 is fully engaged (FIG. 7B), the second node 14B spins in a positive direction; therefore, when the first brake 36 is partially engaged, by applying an amount of pressure that is lower than its full engagement pressure (in between the pressure applied in FIG. 7A (zero) and in FIG. 7B (full)). To result in the desired amount of pressure being applied to the first brake 36, the control system 200 may be used (see FIG. 7C).

Thus, the method 100 includes additional steps of determining the actual speed of the second member 14B at box 204 in the control system. The actual speed may be determined in any suitable manner, such as by measuring or estimating. The method 100 includes comparing the absolute value of the actual speed of the second member 14B with the predetermined upper threshold speed 202. The method 100 could include, for example, providing the actual speed of the second member 14B and the predetermined upper threshold 204 to a controller 206 such as a proportional-integral-derivative controller (PID controller).

If the absolute value (or magnitude) of the actual speed of the second member 14B exceeds the predetermined upper threshold 202, the controller 206 estimates an amount of pressure or an amount of change in pressure to apply to the first brake 36 by the transmission 10. Accordingly, the controller 206 sends a signal to the transmission 10 to command the transmission 10 to apply an estimated desired fluid pressure to the first brake 36, which is based on the actual speed of the second member 14B and the predetermined upper threshold 202.

Figure 7D:
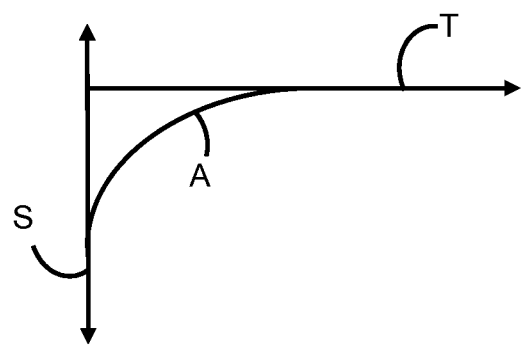
FIG. 7D is a graph illustrating results of implementing the method of FIG. 4.

In some variations, the controller 206 is not used to determine the estimated pressure, but a strong command profile using a controller 206 can help move the actual speed closer and closer to zero without overshooting into the positive spin range, which helps stabilize the result. For example, as shown in FIG. 7D, the speed S is illustrated on a vertical axis, with time T illustrated on a horizontal axis. The actual speed profile A is below the time T axis because the second member 14B spins in a negative direction (unless it overshoots the zero target, which is not shown in FIG. 7C). The controller 206 may cause the actual speed A of the second member 14B to approach zero (or the predetermined upper threshold 202, which is preferably close to zero) without overshooting into a positive speed range.

The steps of determining the actual speed A of the second member 14B, comparing the absolute value of the actual speed A to a predetermined upper threshold 202, and adjusting the fluid pressure applied to the first brake 36 are repeated until the absolute value of the actual speed A drops below or equals the predetermined upper threshold 202.

Referring back to FIG. 6, the shift table for various scenarios of the transmission 10, which is not connected to a torque converter, are illustrated. For example, when shifting from reverse to drive, the first clutch 26, the first brake 36, the fourth brake 32, and the second brake 34 are applied. Prior to applying the second brake 34, the first brake 36 is engaged, as explained above, and a controller, such as controller 206, determines how much fluid pressure to apply to the first brake 36 to result in a zero or near zero slip speed across the second member 14B. Once the desired slip speed exists, the second brake 34 is applied. Then, the first brake 36 is released. The fourth brake 32 and the first clutch 26 are also released, and they may be released before or after the second brake 34 is applied.

As illustrated in FIG. 6, when a vehicle is rolling in reverse, and the vehicle is shifted into drive, an additional brake (the third brake 30) is applied. This occurs in order to brake the output member 22, similar to the scenario described above with respect to FIGS. 5A and 5B, except that FIG. 6 applies to the transmission 10 for use without a torque converter 11 as illustrated in FIGS. 7A-7D. Therefore, both the first and third brakes 36, 30 are applied prior to applying the second brake 34, and then the first and third brakes 36, 30 are released. In the alternative, the output member 22 could be braked with the vehicle braking system, as explained above. For a drive to first gear launch, the second brake 34 is applied in a steady state manner, and the fourth brake 32 is applied. For a drive to first gear steady state shift, the second and fourth brakes 34, 32 are applied in a steady state manner.

The controller 206 is configured to control the operation of one or more components of the powertrain system such as the transmission 10. The controller 206 may include a Powertrain Control Module (PCM) and may perform the function of an engine controller and a transmission controller; however, these two controlling functions may be performed by a single device or a plurality of communicatively connected devices. Control module, module, controller, control unit, processor and similar terms mean any suitable one or various combinations of one or more of Application Specific Integrated Circuit (s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. Thus, the controller 206 may include one or more processors and one or more computer readable media storing program instructions. The controller 206 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators such as the engine actuators. Loop cycles may be executed at regular intervals, for example each 1, 10, and 100 milliseconds during ongoing engine and vehicle operation. Alternatively, algorithms may be executed in response to the occurrence of an event.

Figure 8:
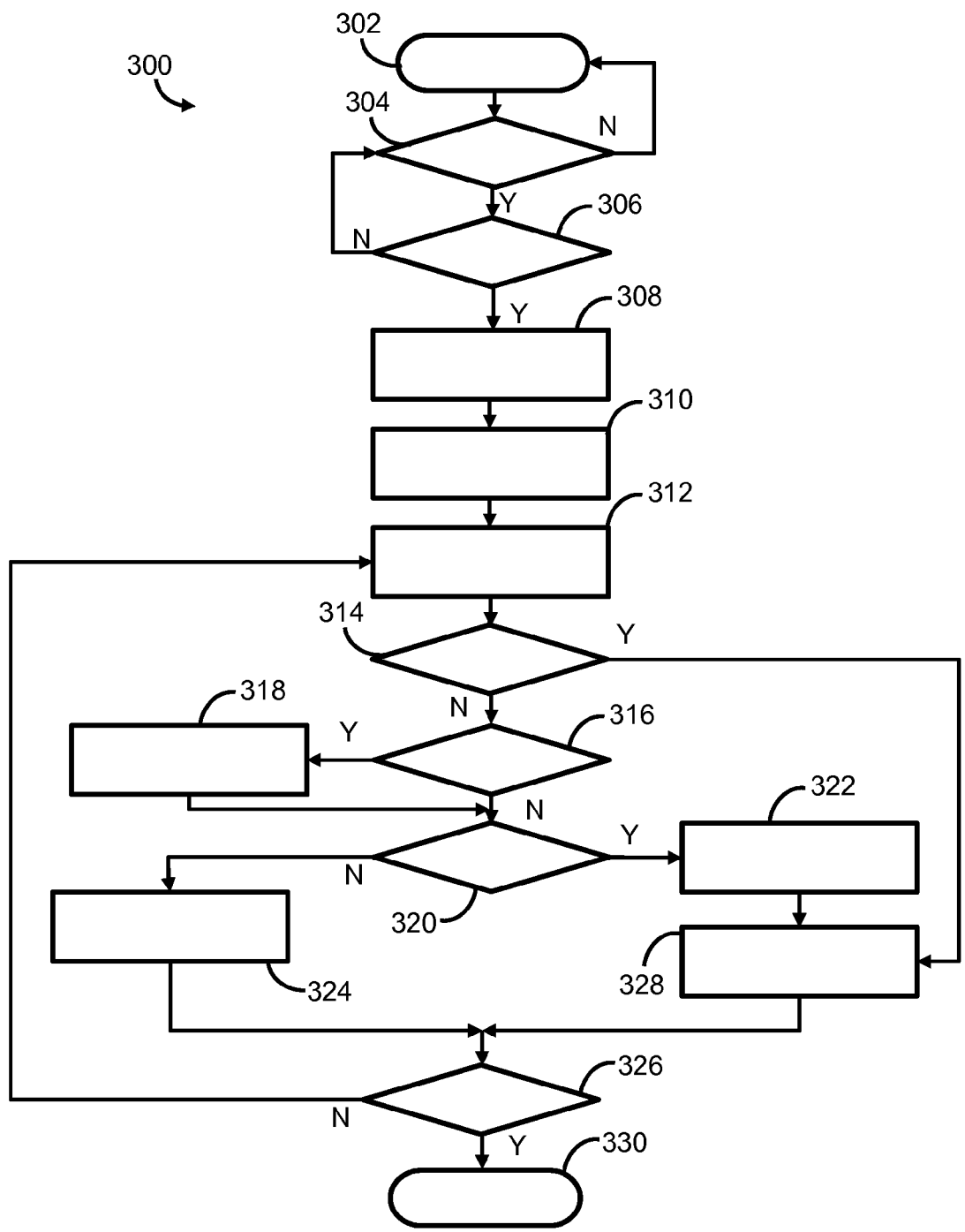
FIG. 8 is a flowchart illustrating a method of controlling a garage shift of a transmission shown in FIGS. 1A and 7A.

Referring to FIG. 8, the controller 206 can be used to execute a method 300 of controlling the transmission 10 or 10A (or any other suitable transmission). The method 300 can override the normal engine and transmission control methodology under specified conditions in order to reduce the driveline torque disturbances due to garage shifting. As discussed above, motor vehicle automatic transmission includes a number of gear elements and friction elements, such as clutches, that are selectively engaged or disengaged according to a predetermined schedule for establishing a desired gear ratio between the transmission input and output shafts. In gear shifting, various mechanisms, such as hydraulic or electrohydraulic mechanisms, are designed to control the clutch flow and pressure so that the shift is substantially imperceptible to the vehicle occupant. This is particularly important in the case of range or garage shifts since the gear element lash can be significant (especially in all-wheel drive vehicles), and an objectionable driveline torque disturbance can occur. It is therefore desirable to minimize the driveline torque disturbance during a garage shift of a transmission (e.g., transmission 10 or 10A) with a high gain high gain clutch. It is also desirable to minimize the gear shift time during a garage shift.

The controller 206 can execute the method 300 in order to minimize the driveline torque disturbance and the gear shift time during a garage shift of the transmission 10 or 10A or any other suitable transmission including a high gain clutch such as the high gain clutch 34.

The method 300 starts in step 302. First, in step 304, the method 300 includes determining whether a garage shift has occurred. In other words, in step 304, the system controller 206 detects an initiation of a garage shift by the transmission 10. As used herein, garage shifts are defined as transmission shifts from Neutral or Park to Reverse or to a Forward range such as Drive or Low (or vice-versa). Additionally, garage shifts include transmission shifts from changes from a forward range, such as Drive or Low, to Reverse (or vice versa). The controller 206 determines that the initiation of a gear shift has occurred when it receives a garage shift signal from a gear selector (not shown) or any other suitable component of the vehicle. If the controller 206 does not receive a garage shift signal, then the controller 206 determines that a garage shift has not occurred, and the method 300 returns to the beginning in step 302.

On the other hand, if the controller 206 receives the gear selector input signal and therefore determines that a garage shift has occurred, the controller 206 determines if the second node 14B is stopped in step 306. Stated differently, in step 306, the method 300 includes determining if the slip speed across the oncoming high gain clutch 34 is zero or negligible due to the application of the first assist clutch 1AC (e.g., first brake 36), the second assist clutch (e.g., fourth brake 32), the holding clutch (e.g., third brake 30), or a combination thereof as discussed in detail above. As discussed above, in response to the detection of the initiation of the garage shift, the first assist clutch 1AC, such as the first brake 36, may be applied to the first node 14A of the first planetary gear set 14 to interconnect the stationary member 50 to the first node 14A, which may be a ring gear, a sun gear, or a planet gear member. Also, in response to the detection of the initiation of the garage shift, the second assist clutch, such as the fourth brake 32, may be applied to the third node 16C of the second planetary gear set 16 to interconnect a stationary member 50 with the third node 16C. The holding clutch, such as the third brake 30, may be applied to the first node 18A of the first planetary gear set 18 to interconnect the stationary member 50 with the first node 18A. When the first assist clutch, the second assist clutch, and the holding clutch are applied, the output member 22 stops spinning as discussed above.

If the slip speed across the oncoming high gain clutch 34 is not about below a speed threshold, the method 300 returns to step 304. If the slip speed across the oncoming high gain clutch 34 is about below a speed threshold, the high gain clutch 34 is applied to the zero speed or very low speed node 14B in step 308 as discussed in detail above. Subsequently, in step 310, a timer is set to zero, a lash detect flag is set to false, and a maximum turbine speed tbn_max is set to equal the measured turbine speed of the turbine of the torque converter 11 when the high gain clutch 34 is applied. The step 310 includes measuring or monitoring the turbine speed after the dog clutch 34 has been applied but before the pressure of the first assist clutch 1AC is decreased. The measured turbine speed may also be referred to as the actual turbine speed, which may be measured using any suitable speed sensor. If the transmission is connected directly to the engine or motor (i.e., not via a torque converter), the speed of the input shaft 12 may be measured. Then, step 312 of the method 300 includes decreasing the pressure of the first assist clutch 1AC (e.g., first brake 36) by a first pressure calibration value X1. Alternatively, the pressure of the first assist clutch 1AC by a first pressure rate of change. The first pressure calibration value X1 may be determined by testing the vehicle and it is dependent on, among other things, transmission fluid temperature. The pressure of the first assist clutch 1AC should not be lower than zero and may be referred to as the first pressure. Subsequently, the controller 206 determines if the lash detect flag is false or if the timer value T (i.e., the time past since the timer started running) is greater than a predetermined time limit Tlimit in step 314 The predetermined time limit may be, for example, about one second. For instance, the predetermined time limit may range between 0.85 and 1.25 seconds. This predetermined time limit may be a function of transmission powerflow, vehicle speed before the shift, transmission output speed when the garage shift is initiated, gear state, etc.

In the first loop of the method 300, it is likely that neither the lash detect flag will not be true nor the timer value T will be greater than the predetermined time limit Tlimit in step 314. If the lash detect flag is false and the timer value T is not greater than the predetermined time limit Tlimit, the controller 206 determines if the measured turbine speed tbn of the torque converter is greater than the maximum turbine speed tbn_max in step 316. Thus, step 316 also includes measuring the turbine speed of the turbine 13 of the torque converter 11 when the dog clutch is applied and reducing the first pressure by the first pressure calibration value X1. If the measured turbine speed tbn is greater than the maximum turbine speed tbn_max, the maximum turbine speed is set to equal the measured turbine speed tbn in step 318. Thereafter, the method 300 continues to step 320. On the other hand, if the measured turbine speed tbn is greater than the maximum turbine speed tbn_max, the method 300 directly continues to step 320.

In step 320, it is determined if the measured turbine speed is less than the difference between the maximum turbine speed tbn_max and a turbine calibration value tnb_delta. Thus, step 320 includes monitoring the actual turbine speed. If the measured turbine speed is less than the difference between the maximum turbine speed tbn_max and a turbine calibration value tnb_delta, the lash detect flag is set to true in step 322, thereby determining that a gear lash has occurred. Conversely, if the measured turbine speed is not less than the difference between the maximum turbine speed tbn_max and a turbine calibration value tnb_delta, the pressure of the second assist clutch (e.g. fourth brake 32) is decreased by a second pressure calibration value X2, and the timer value T is increased by a predetermined loop time value t_delta in step 324. Alternatively, the pressure of the second assist clutch (e.g. fourth brake 32) is decreased by a second pressure rate of change, and the timer value T is increased by a predetermined loop time value t_delta in step 324. The predetermined loop time value t_delta may be determined via testing. The predetermined loop time value t_delta may be, for example, twenty milliseconds. Afterwards, the method 300 continues to step 326.

Returning to step 322, after the lash detect flag is set to true in step 322, the pressure of the second assist clutch 2AC (e.g. fourth brake 32) is decreased by a third pressure calibration value X3 in step 328. The third calibration value X3 may be greater than the second calibration value X2. In addition, the third calibration value X3 may be determined by testing the vehicle and it is dependent on, among other things, transmission fluid temperature. Alternatively, the pressure of the second assist clutch 2AC may be reduced by a third rate of change value. The pressure of the second assist clutch 2AC will not be lower than zero and may be referred to as the second pressure 2AC. Subsequently, the method continues to step 326.

Returning to step 314, if the lash detect flag is true or if the timer value T (i.e., the time past since the timer started running) is greater than a predetermined time limit Tlimit, the step 328 is executed as discussed above. That is, the pressure of the second assist clutch 2AC (e.g. fourth brake 32) is decreased by a third pressure calibration value X3.

After the steps 324 or 328 are executed, the method continues to step 326. In step 326, it is determined whether the pressure of the first assist clutch 1AC is less than or equal to a first predetermined pressure threshold 1AC_threshold, and whether the pressure of the second assist clutch 2AC (e.g. fourth brake 32) is less than or equal to a second predetermined pressure threshold 2AC_threshold. The first and second predetermined pressure thresholds 1AC_threshold, 2AC_threshold may each be about zero. If the pressure of the first assist clutch 1AC is greater than the first predetermined pressure threshold 1AC_threshold or if the pressure of the second assist clutch 2AC is greater than the second predetermined pressure threshold 2AC_threshold, the method 300 returns to step 312. That is, the pressure of the first assist clutch 1AC is once again decreased by the first pressure calibration value X1.

If the pressure of the first assist clutch 1AC is less than or equal to a first predetermined pressure threshold 1AC_threshold, and if the pressure of the second assist clutch 2AC is less than or equal to a second predetermined pressure threshold 2AC_threshold, the methods 300 ends in step 330, and the garage shift is completed. Although the exemplary method described above employs two assist clutches, it is envisioned that the method may use only one assist clutch or more than two assist clutches.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a transmission, comprising:
    detecting an initiation of a garage shift of the transmission;
    in response to such detection, applying a first assist clutch to interconnect a first stationary member to a first planetary gear set of the transmission;
    applying a second assist clutch to interconnect a second stationary member to a second planetary gear set of the transmission, wherein the second planetary gear set is coupled to an output member of the transmission;
    applying a primary clutch to interconnect the first planetary gear set to a third stationary member;
    reducing a first pressure applied to the first assist clutch of the transmission by a first pressure calibration value;
    determining whether a gear lash has occurred; and
    after determining whether the gear lash has occurred, reducing a second pressure applied to the second assist clutch of the transmission to minimize driveline torque disturbances during the garage shift.

2. The method of claim 1, wherein determining whether the gear lash has occurred further includes:
    monitoring a turbine speed of a torque converter coupled to the transmission when the primary clutch is applied to determine a maximum turbine speed; and
    monitoring the turbine speed after the garage shift has been initiated to determine an actual turbine speed.

3. The method of claim 2, wherein determining whether the gear lash has occurred further includes determining if the actual turbine speed is less than a difference between the maximum turbine speed and a turbine speed calibration value.

4. The method of claim 3, wherein reducing the second pressure includes reducing the second pressure applied to the second assist clutch by a second pressure calibration value if the actual turbine speed is not less than the difference between the maximum turbine speed and the turbine speed calibration value.

5. The method of claim 4, wherein reducing the second pressure includes reducing the second pressure applied to the second assist clutch by a third pressure calibration value if the actual turbine speed is less than the difference between the maximum turbine speed and the turbine speed calibration value, the third pressure calibration value being greater than the second pressure calibration value.

6. The method of claim 5, wherein the step of reducing the second pressure applied to the second assist clutch by the third pressure calibration value is performed if a predetermined amount of time has passed since applying the primary clutch even if the actual turbine speed is not less than the difference between the maximum turbine speed and the turbine speed calibration value.

7. The method of claim 6, wherein the predetermined amount of time is a function of a transmission output speed when the garage shift is initiated.

8. The method of claim 6, wherein the step of reducing the second pressure of the second assist clutch of the transmission is performed when the predetermined amount of time has passed since the primary clutch was applied even if the gear lash has not occurred.

9. The method of claim 1, wherein the step of reducing the first pressure applied to the first assist clutch of the transmission by the first pressure calibration value is repeated if the first pressure is less than or equal to a first predetermined pressure threshold and the second pressure is less than or equal to a second predetermined pressure threshold.

10. The method of claim 1, wherein the step of reducing the second pressure applied to the second assist clutch of the transmission is repeated if the first pressure is less than or equal to a first predetermined pressure threshold and the second pressure is less than or equal to a second predetermined pressure threshold.

11. The method of claim 1, wherein the primary clutch is a dog clutch.

12. A method of controlling a transmission, comprising:
    applying a first assist clutch to interconnect a first stationary member to a first member of a first planetary gear set of the transmission, the first planetary gear set including the first member, a second member, and a third member;
    applying a second assist clutch to interconnect a second stationary member to a first member of a second planetary gear set of the transmission;
    applying a primary clutch to interconnect the second member of the first planetary gear set to a third stationary member;
    measuring a turbine speed of a turbine of a torque converter coupled to an input member of the transmission when the primary clutch is applied to determine a maximum turbine speed;
    reducing a first pressure applied to the first assist clutch of the transmission by a first pressure calibration value after applying the primary clutch;
    measuring the turbine speed after reducing the first pressure to determine an actual turbine speed;
    determining whether the actual turbine speed is less than a difference between the maximum turbine speed and a turbine speed calibration value in order to determine whether a gear lash has occurred;
    reducing a second pressure of the second assist clutch by a second pressure calibration value if the actual turbine speed is not less than the difference between the maximum turbine speed and the turbine speed calibration value; and
    reducing the second pressure of the second assist clutch by a third pressure calibration value if the actual turbine speed is less than the difference between the maximum turbine speed and the turbine speed calibration value to minimize driveline torque disturbances during a garage shift.

13. The method of claim 12, further comprising repeating the step of reducing a first pressure applied to the first assist clutch of the transmission by a first pressure calibration value if the first pressure is not zero.

14. The method of claim 13, wherein the step of reducing the second pressure of the second assist clutch by the third pressure calibration value is performed after a predetermined amount of time has passed since applying the primary clutch even if the actual turbine speed is not less than the difference between the maximum turbine speed and the turbine speed calibration value.

15. The method of claim 14, wherein the predetermined amount of time is one second.

16. The method of claim 12, wherein the second pressure calibration value is greater than the first pressure calibration value.

17. The method of claim 16, wherein the third pressure calibration value is greater than the second pressure calibration value.

18. The method of claim 12, further comprising detecting the garage shift before applying the applying the first assist clutch.

19. A method of controlling a transmission, comprising:
   applying assist clutches to interconnect stationary members to planetary gear sets of the transmission;
   applying a primary clutch to interconnect a member of one of the planetary gear sets to one of the stationary members;
   measuring a rotational speed of a rotational member of the transmission when the primary clutch is applied to determine a maximum turbine speed;
   reducing pressures applied to the assist clutches of the transmission by a first pressure calibration value after applying the primary clutch;
   measuring the rotational speed of the rotational member after reducing the pressures of the assist clutches by the first pressure calibration value to determine an actual turbine speed;
   determining whether the actual turbine speed is less than a difference between the maximum turbine speed and a turbine speed calibration value in order to determine whether a gear lash has occurred;
   reducing the pressures applied to the assist clutches by a second pressure calibration value if the actual turbine speed is not less than the difference between the maximum turbine speed and the turbine speed calibration value; and
   reducing the pressures applied to the assist clutches by a third pressure calibration value if the actual turbine speed is less than the difference between the maximum turbine speed and the turbine speed calibration value to minimize driveline torque disturbances during a garage shift.

20. The method of claim 19, wherein the third pressure calibration value is greater than the second pressure calibration value.

\* \* \* \* \*